United States Patent [19]

Hunt et al.

[11] Patent Number: 5,590,738
[45] Date of Patent: Jan. 7, 1997

[54] HUNTING STAND AND GAME CARRIER COMBINATION

[76] Inventors: Argil G. Hunt, 282 Lynn Rd.; Randy A. Hunt, 232 Lynn Rd., both of Johnson City, Tenn. 37604

[21] Appl. No.: 406,550

[22] Filed: Mar. 20, 1995

[51] Int. Cl.$^6$ ..................................... A45F 3/00
[52] U.S. Cl. ........................... 182/116; 182/187
[58] Field of Search ...................... 182/116, 187, 182/188, 20, 129

[56] References Cited

U.S. PATENT DOCUMENTS

| | | | |
|---|---|---|---|
| 3,282,375 | 11/1966 | Ray | 182/116 X |
| 4,257,490 | 3/1981 | Bandy | 182/116 |
| 4,614,252 | 9/1986 | Tarner | 182/187 X |
| 4,722,420 | 2/1988 | Arthurs et al. | 182/116 X |
| 5,064,020 | 11/1991 | Eagleson | 182/116 X |
| 5,105,908 | 4/1992 | Freund | 182/187 X |
| 5,253,732 | 10/1993 | Daniels | 182/187 X |
| 5,279,390 | 1/1994 | Phillips | 182/187 |
| 5,295,566 | 3/1994 | Mullin | 182/116 X |

FOREIGN PATENT DOCUMENTS 239473  10/1911  Germany ........................ 182/187

*Primary Examiner*—Karen J. Chotkowski

[57] ABSTRACT

An apparatus providing a game stand and game carrier combination having an elongated frame providing a ladder, the frame having wheels mounted thereon for transport of the apparatus, an elongated stabilizer bar having one of its ends mounted to the frame and extending outwardly therefrom, the other end of the stabilizer bar being provided with a first gripping device for contact with an upright for laterally stabilizing the frame in a generally upright posture with respect to the upright, a platform on the frame and extending outwardly therefrom in the same general direction as the stabilizer bar, and a second gripping device provided on the apparatus at an upper portion thereof for contact with the upright for further laterally stabilizing the frame at its upper portion with respect to the upright.

13 Claims, 3 Drawing Sheets

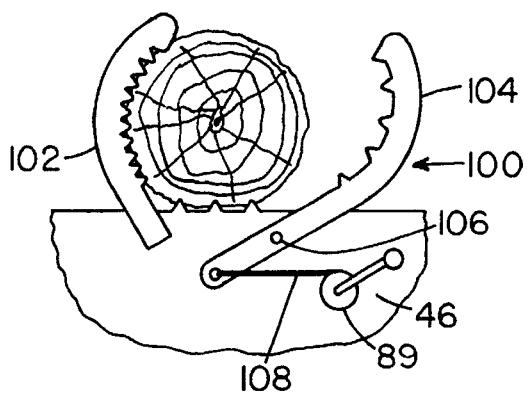
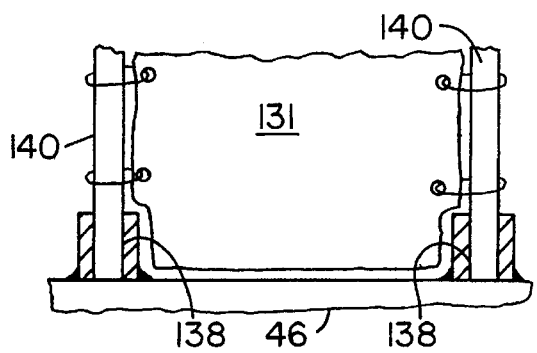
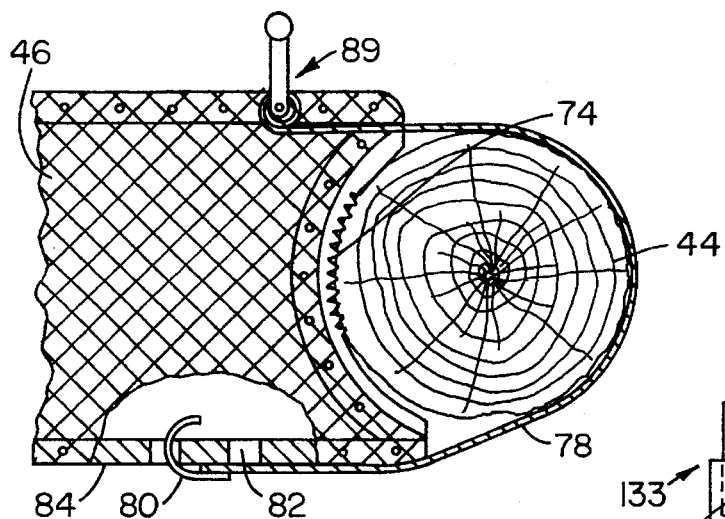
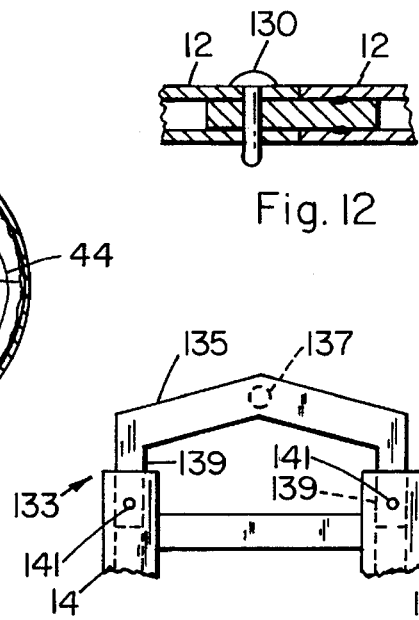
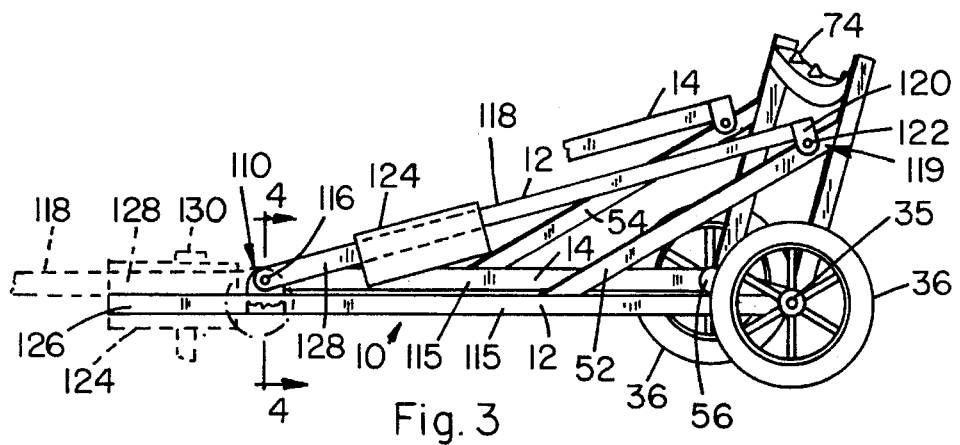

HUNTING STAND AND GAME CARRIER COMBINATION

FIELD OF THE INVENTION

The present invention relates generally to game hunting or wild life observing and more particularly to easily transportable stands or supports which are convertible to carts, i.e., stand and carrier combination apparatus which can be used to both observe and transport game or to transport equipment and the like.

BACKGROUND OF THE INVENTION

Tree stands and game observations platforms are widely used as a means for assisting the hunter or wildlife observer in his activities such as in gaining the advantage of unobstructed sight and a vantage point for shooting or photographing. Unfortunately, it is necessary to transport the game and any auxiliary apparatus and other gear in and out of remote locations. If hunting large game, it is practically a necessity to have a means for transporting the game out of these areas if one is not to leave substantial portions of the carcass behind. Since many such outings require transport over long distances and over rough terrain it is also desirable to have a lightweight unit to accomplish the transport without a resultant loss of structural integrity and breakdown of the unit.

In this regard, many hunters are injured each year from tree stand related injuries, so the need for a stable platform is paramount. Getting proper height in the air is also crucial, however, the safety and ease of putting the stand up should not be compromised. Further, when taking a shot with a camera or a gun it is important to be stable, preferably leaning against a stable object. On the ground, tripods can be used, in a tree stand there is usually no such ability, thus it is desirable to have a stable apparatus for that purpose which is provided with convenient means for stabilizing a gun or camera or the like.

DISCUSSION OF THE PRIOR ART

Although there are several game stands of similar construction shown in the prior art, none possesses a highly stabilized configuration in both the upright and folded forms. As well, none possesses the safety, security, versatility and ease of deployment as that of the present invention.

U.S. Pat. No. 5,295,556 discloses a selectively convertible device as a tree stand, free standing observation platform, camouflage shelter, and mobile cart used primarily for hauling canoes, boats and large equipment. This device, however, as taught, does not provide adequate support in tree stand form, providing little more than a ladder with platform attached. No means of securing or stabilizing the apparatus exists until it is climbed and a strap is attached to the top. No provision is made for the platform sliding down the tree and out from under the climber, and no provision is made for a gun or camera rest to aid the user. Further, additional pieces must be added, or excluded in order to transform the apparatus into a hauling device, whereas with the present invention, no significant work is necessary for conversion to a rigid triangular cart without the need for additional pieces.

OBJECTS OF THE INVENTION

Objects, therefor, of the present invention, are: to provide a transportable game hunting stand apparatus which is lightweight, strong, rigid and readily useable as a game transport means; to provide such apparatus with readily attachable gun or blind or the like auxiliary means, to provide such apparatus, in at least one embodiment, with integrated game stand and transport structure which requires no structural conversion of the apparatus; and to provide such apparatus with folding means whereby the lengthwise dimension of the stand ladder section can be essentially halved for purposes of transporting game or the apparatus itself.

BRIEF DESCRIPTION OF THE INVENTION

The above and further objects hereinafter becoming evident have been attained in accordance with the present invention through the discovery of game hunting stand and transport or carrier combination apparatus comprising elongated, lightweight, rigid, elongated frame means having substantially parallel side rail means interconnected by a plurality of cross-member means for providing ladder means and having a longitudinal axis, said frame means comprising an upper section having an outer end portion, an intermediate section, and a lower section having an outer end portion, said sections lying progressively along said longitudinal axis, said lower and intermediate sections and an adjacent portion of said upper section lying substantially contiguous the same general plane, support means on said upper section for mounting wheel means thereon, elongated stabilizer means having one of its ends mounted to said frame means, preferably within said intermediate section thereof and extending outwardly from one side of said general plane, the other end of said stabilizer means being provided with first gripping means for contact with an upright for laterally stabilizing said frame means against said upright at its said intermediate section in a generally upright posture, said outer end portion of said upper section being provided with platform means extending outwardly from said one side of said general plane, and second gripping means provided on an outer edge portion of said platform means spaced from said general plane for contact with and attachment to said upright for laterally stabilizing said frame means at its upper section against said upright.

In certain preferred embodiments:

(a) said side rail means are pivotally jointed by hinge means within said intermediate section such that said lower section and upper section and the adjacent portions of said intermediate section can be folded toward each other about the axis of said hinge means and whereby said upper and lower sections can be positioned proximate each other at an acute angle with said platform means extending substantially therebetween;

(b) cooperating components of connector means are provided on said outer end portion of said lower section and on said outer end portion of said upper section whereby said upper section and lower sections, including said platform means can be rigidly interconnected in a triangular configuration to form a highly structurally stable game transporting tailer;

(c) said second gripping means comprises tooth means for engaging said upright and partially penetrating thereinto, first strap means is provided having one end affixed to one side portion of said platform means and adapted to loop around said upright and be fastened at its other end to an opposite side portion of the said platform means, and tightening means is provided for said strap means for tightening the same around said upright and drawing said tooth means into said upright to form a rigid and highly laterally stable connection of said platform means to said upright.

(d) said stabilizer means comprises a bar which is pivotally connected at one end to said frame means for selectively adjusting the angle of said bar with respect to said frame means and said upright for accommodating variations in the distance from and the angular relationship of said frame means to said upright;

(e) said stabilizer means comprises a generally bar-shaped means which is pivotally connected to said frame means and which is provided with length adjustment means for selectively adjusting the length and desired angle of said stabilizing means for accommodating variations in the distance from and the angular relationship of said frame means to said upright; and (f) the apparatus wherein the longitudinal segments of each said side rail means which lie adjacent the joint therein are dimensioned and configured with respect to said hinge axis and each other such as to overlap when said frame means is in its fully extended posture, and lock means is provided and adapted to be placed in position to simultaneously engage portions of both said overlapping segments and prevent relative motion thereof about said axis.

BRIEF DESCRIPTION OF THE DRAWINGS

The invention will be further understood from the following description and drawings of certain preferred embodiments of the present invention, wherein certain structural portions are enlarged in dimensions for clarity and the figures are not drawn to scale, and wherein:

FIG. 2 is a top view of the platform secured to the tree trunk shown in cross-section;

FIG. 3 is an isometric view of the apparatus shown in its trailering attitude;

FIG. 9 is a side view of a portion of the platform means showing a portion of one side portion of a hunting blind attachment mounted thereon by grommets and tie cords;

FIG. 10 is a top elevational view of a mechanically operated jaw embodiment of the gripping means;

FIG. 11 is a top view of a hitch attachment for the apparatus; and

FIG. 12 is a partial sectional view of a tube and lock-pin construction.

DETAILED DESCRIPTION OF THE DRAWINGS

Figure 1:
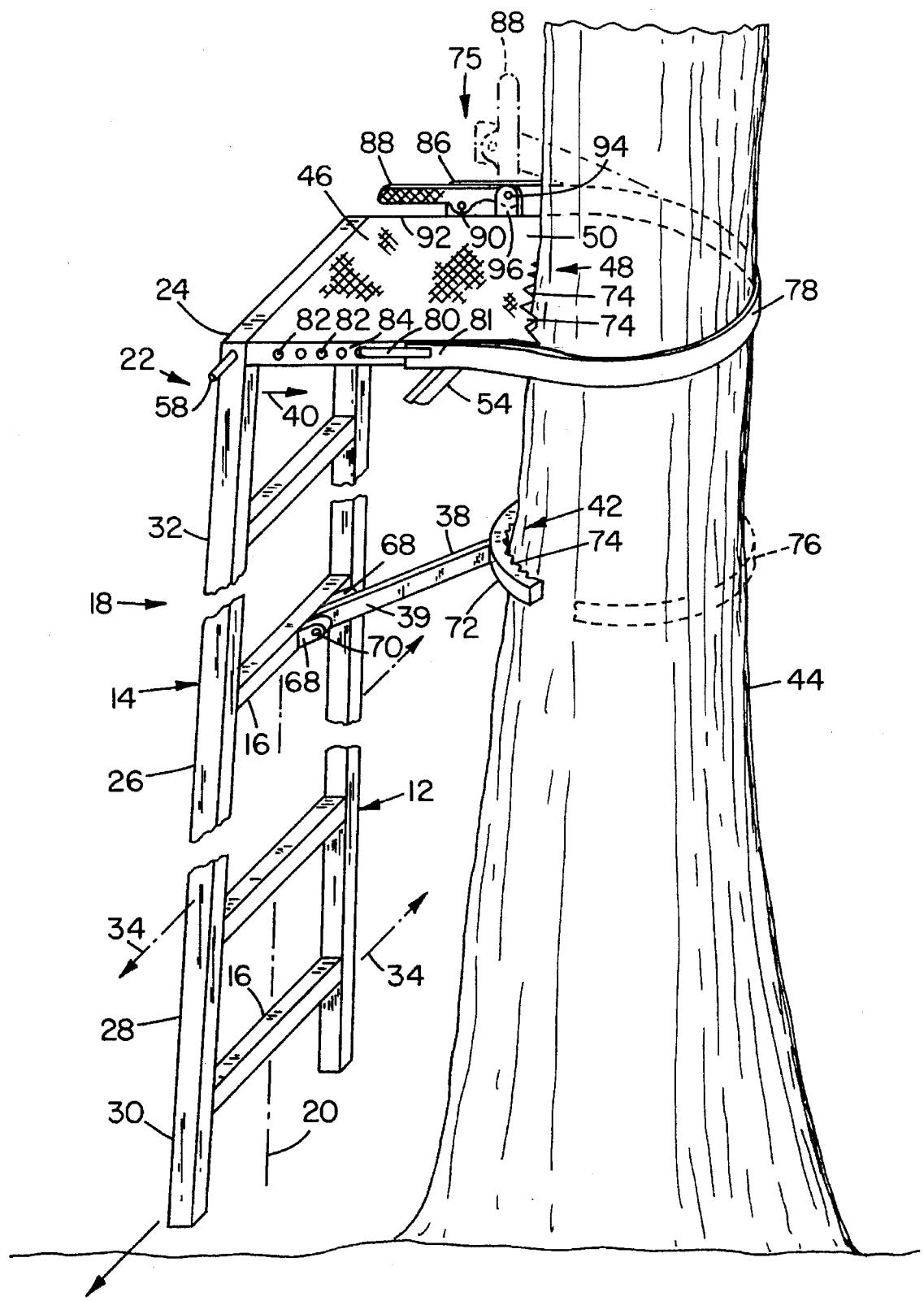
FIG. 1 is a side, isometric view of the present apparatus in operative position against a tree trunk.
Figure 4:
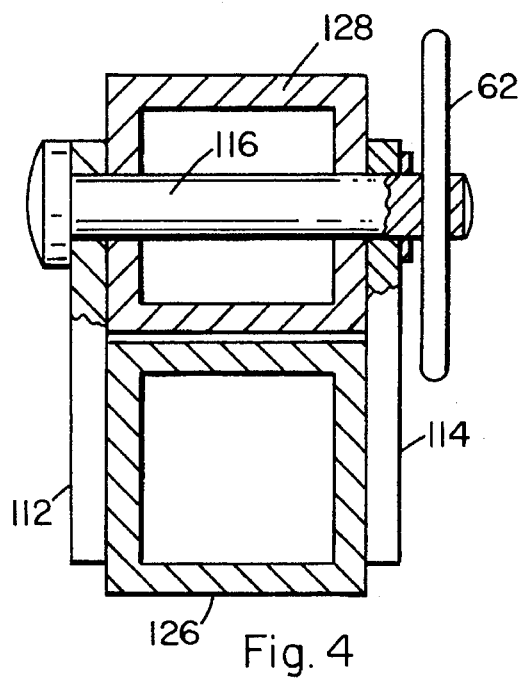
FIG. 4 is a cross-sectional view taken along line 4—4 of FIG. 3 in the direction of the arrows.

Referring to the drawings and with particular reference to the claims herein, the present apparatus is defined in its broad sense as an apparatus providing a game stand and game carrier combination comprising elongated, lightweight, rigid, frame means generally designated 10 having substantially parallel side rail means 12, 14 interconnected by a plurality of cross-member means 16 for providing ladder means 18 and having a longitudinal axis 20, said frame means having an upper section 22 having an outer end portion 24, an intermediate section 26, and a lower section 28 having an outer end portion 30, said sections lying progressively along said longitudinal axis, said lower and intermediate sections and an adjacent portion 32 of said upper section lying substantially contiguous the same general plane 34, support means 35 on said upper section for mounting wheel means 36 thereon, elongated stabilizer means 38 having one of its ends 39 mounted to said frame means preferably within said intermediate section 26 thereof and extending outwardly from one side 40 of said general plane, the other end of said stabilizer means being provided with first gripping means 42 for contact with an upright 44 for laterally stabilizing said frame means at its said intermediate section in a generally upright posture with respect to said upright, said outer end portion 24 of said upper section being provided with platform means 46 extending outwardly from said one side of said general plane, and second gripping means 48 provided on an outer edge portion 50 of said platform means and spaced from said general plane for contact with and attachment to said upright for laterally stabilizing said frame means at its upper section with respect to said upright.

The frame means is preferably welded up of lightweight material such as one inch square aluminum or lightweight steel tubing and, in addition to the cross-members or ladder steps 16, may be provided with rigidifying means such as bracing members 52, 54 wherever needed. The various sections, i.e., upper 22, intermediate 26 and lower 28 may be as long as desired and can have as many steps 16 as is required for convenience and safety. Typically the overall extended length of the frame is from about ten to about sixteen feet, although other lengths can obviously be used. The steps preferably are spaced apart as on conventional ladders and the aforesaid three sections may be considered to be substantially equal in length, i.e., the portions thereof which lie along the longitudinal axis, for purposes of description herein.

Figure 8:
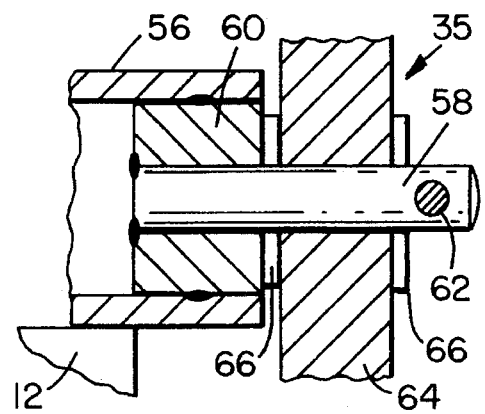
FIG. 8 is a cross sectional view of one preferred embodiment of the wheel mounting structure.

A preferred type of axle means 35 is shown in FIG. 8 and comprises an axle tube 56 which is welded, e.g., across the ends of side rails 12 and 14. The axle rod 58 is welded to a square bushing 60 spot welded to the inside of tube 56. Preferably, a quick-disconnect lock-pin 62 is used to lock the wheel hub 64 and rub washers 66 to the axle means. Such a lock-pin is preferably and conveniently used for making the other quick-disconnect joints or couplings used in the present apparatus as will be further described below. It is particularly noted however, that conventional nuts and bolts, cotter pins or the like fastening means may be employed in the alternative.

The stabilizer means 38 is preferably in the shape of a bar and pivotally connected at is one end 39 to a step member 16 by any suitable hinge or pivot means such as bearing flanges 68 welded on the step member on either side of bar 38 which is pivotally attached thereto by pin 70. When the apparatus is in its folded transport condition, bar 38 is pivoted down against the ladder steps 16 and temporarily secured thereto by any suitable quick disconnect means. The outer end of bar 38 is provided with first gripping means which preferably is in the form of a shaped member 72 provided with a plurality of teeth 74 which are designed to frictionally engage a tree trunk or the like, preferably with slight but not damaging penetration of the bark. Member 72 does not necessarily have to be provided with means such as second strap means 76, however, such a tightening device is desirable for stabilizing the apparatus against a tree or other upright such that the user can safely climb up the ladder to the platform and tighten the platform against the tree for stabilizing the entire apparatus in an operative position. In this regard, it is preferred that the overall apparatus and bar 38 be configured and dimensioned such that a tightening device such as strap means 76 can be reached conveniently by the user from the ground.

A tightening means or device 75 which may be used also for strap 76 is shown for first strap means 78 wherein the strap is of any lightweight, strong and weather resistant material such as Nylon or the like. The device may comprise a hook 80 affixed to one end 81 of the strap and insertable through any of a plurality of holes 82 provided in one side portion 84 of the platform. The other end 86 of the strap is affixed to a lever 88 by, e.g., pivot pin 90, which lever is pivotally mounted on the opposite side portion 92 of the platform by pivot pin 94 and bracket 96 affixed to portion 92.

In the use of such strap means 76 or 78, lever 88 is placed in its upright dotted position, the strap looped around the tree, hook 80 then hooked through a selected hole 82 which renders the strap as tight as it can be readily pulled by hand, and lever 88 then pulled downwardly past its overcenter position to firmly pull and maintain the gripping means against the tree. Alternatively to the simple lever 88, a conventional ratchet type strap tightener such as 89 shown in FIG. 2 may be employed.

As shown in FIG. 10, a jaw type gripping device 100 may be employed as an alternative to the strap devices. This device comprises a pair of toothed jaws 102, 104, one of which, e.g., 102 is affixed to platform 46 or any other supporting means on the apparatus, and the other 104 is pivotally mounted to said supporting means by pivot pin 106. A tightening device such as ratchet tightener 89 mounted on said supporting means and connected to jaw 104 by a wind-up strap or cable 108 can be employed for strongly pivoting jaw 104 against the tree and pulling jaw 102 also thereagainst. Alternatively, jaw 102 may also be pivotally mounted.

Figure 6:
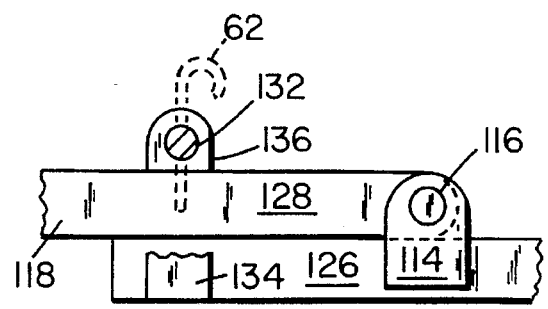
FIG. 6 is a side view of the outline encircled portion of FIG. 3 with portions of the rail means adjacent the pivot point being in locked overlapping relationship whereby the frame means is in its fully extended posture.
Figure 7:
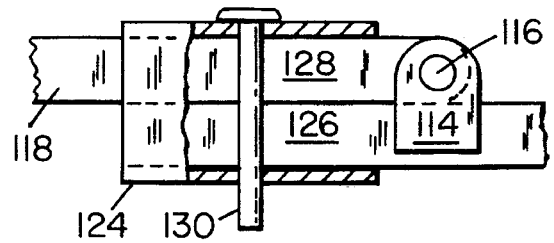
FIG. 7 is a view as in FIG. 6, partially in section, and showing a variation of the rail position lock means.
Figure 5:
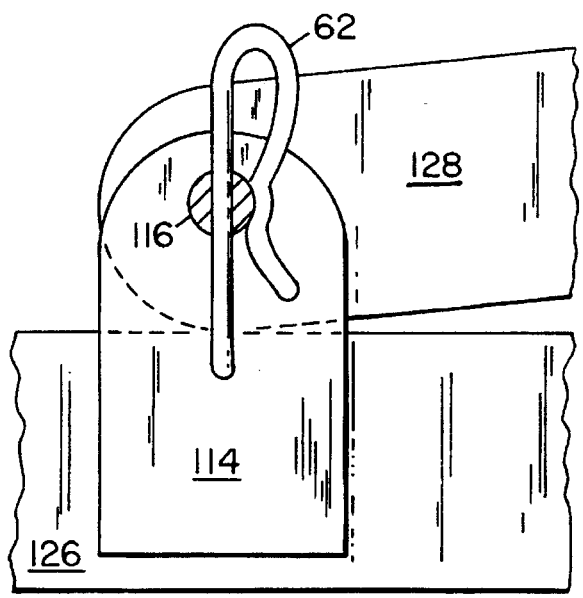
FIG. 5 is an enlarged side view of the outline encircled portion of the hinge or pivot means of FIG. 3.

Referring to FIG. 3–7, each rail 12 and 14 is preferably jointed at 110 by a hinge means such as a pivot provided by bearing plates 112, 114 welded to either side of the upper section 115 of each rail within the aforesaid intermediate section of the frame means 10, and pivot pin 116 rotatably passing thru the plates and the lower section 118 of the rail. When the apparatus is to be placed in its operating condition, lower section 118 of each rail is released from its connection 119 to the platform end of the frame. This connection 119 which is made for transporting the apparatus by hand or by a towing vehicle is made, for example, by bracket 120 affixed to section 118 and pin 122 which passes thru the bracket and through the adjacent bracing member or any other portion of the frame means. Section 118 is then pivoted around pin 116 to lie parallel to upper section 115 as shown by the dotted outline in FIG. 3. The lock means or sleeve 124 as shown in FIGS. 3 and 7 is then slid over the overlapping portions or segments 126, 128 of sections 115 and 118 respectively, and a pin such as 130 is dropped through aligned apertures in the sleeve and the segments to prevent inadvertent sliding of the sleeve from its locking position. Alternatively, as shown in FIG. 6, a pin 132, lock pin 62, and bearing brackets 134, 136 affixed to either side of 126 may be employed.

Referring to FIG. 9 the connector means for removably affixing the canvas hunting blind 131 or other attachment such as a gun rest to the platform 46 comprises vertical tubular members 138 affixed to the side portions of the platform for receiving shaft segments 140 to which the attachment is affixed.

It is noted that the various structural components of the frame means and other portions of the apparatus can be welded together or joined by means such as shown in FIG. 12 or the like such that the apparatus can be stored then reassembled. Also the various components may be extendable by means known to the art.

The hitch means 133 for vehicle towing purposes may comprise a bracket 135 such as shown in FIG. 11, wherein said bracket is provided with a socket 137 for pivotal mounting on a towing ball of a vehicle, and the tubular ends 139 of the bracket are dimensioned to slide within the ends of the rails 12 and 14. Suitable means such as bolts or pins 141 can be used to affix said rail ends to the bracket for towing. It is noted that bracket 135 also provides a convenient handle means for hand pulling the apparatus out of the field.

The invention has been described in detail with particular reference to preferred embodiments thereof, but it will be understood that variations and modifications will be effected with the spirit and scope of the invention.

I claim:

1. An apparatus providing a game stand and game carrier combination comprising elongated, lightweight, rigid, frame means having substantially parallel side rail means interconnected by a plurality of cross-member means for providing ladder means and having a longitudinal axis, said frame means comprising an upper section having an outer end portion, an intermediate section, and a lower section having an outer end portion, said sections lying progressively along said longitudinal axis, said lower and intermediate sections and an adjacent portion of said upper section lying substantially contiguous the same general plane, wheel support means on said upper section for mounting wheel means thereon for transport of said apparatus, elongated stabilizer means having one of its ends mounted to said frame means and extending outwardly from one side of said general plane, the other end of said stabilizer means being provided with first gripping means for contact with an upright for laterally stabilizing said frame means in a generally upright posture with respect to said upright, said outer end portion of said upper section being provided with platform means extending outwardly from said one side of said general plane, and second gripping means provided on said apparatus at said upper section and spaced from said general plane to said one side thereof for contact with said upright for further laterally stabilizing said frame means at its upper section with respect to said upright, wherein said second gripping means is located on outer edge portions of said platform means and wherein said side rail means are pivotally jointed by hinge means within said intermediate section such that said lower section and upper section and the adjacent portions of said intermediate section can be folded toward each other about the axis of said hinge means and whereby said upper and lower sections can be positioned proximate each other at an acute angle with said platform means extending substantially between the said outer end portions thereof, and wherein cooperating components of connector means are provided on said outer end portion of said lower section and on said outer end portion of said upper section whereby said upper and lower sections, including said platform means can be rigidly interconnected in a generally triangular configuration to form a highly structurally stable game transporting trailer.

2. The apparatus of claim 1 wherein said second gripping means comprises tooth means for engaging said upright and partially penetrating thereinto, and first strap means having one end affixed to one side portion of said platform means and adapted to loop around said upright and be fastened at its other end to the opposite side portion of the said platform means, and tightening means on said strap means for tightening the same around said upright and drawing said tooth means into said upright to form a rigid and highly laterally stable connection of said platform means to said upright.

3. The apparatus of claim 1 wherein cooperating components of quick-disconnect means are provided on said wheel support means for providing for quick and easy attachment and detachment of said wheel means to and from said frame means.

4. The apparatus of claim 1 wherein said stabilizer means comprises generally bar-shaped means which is pivotally connected to said frame means for selectively adjusting the angle of said stabilizing means with respect to said frame means for accommodating variations in the distance from and in the generally parallel relationship of said frame means to said upright.

5. The apparatus of claim 1 wherein said stabilizer means is adapted to be securely fastened to said upright with said first gripping means comprising tooth means for engaging said upright and adapted to partially penetrate the surface thereof, and second strap means having one end affixed to said stabilizer means and adapted to loop around said upright, the other end of said strap means being affixed to tightening means on said stabilizer means for tightening said strap means around said upright and drawing said tooth means into the surface thereof to form a substantially rigid connection of said intermediate section of said frame means to said upright.

6. The apparatus of claim 1 wherein connection means is provided on said platform means to receive and stabilize one or more attachment means selected from the group consisting of a game blind, gun rest, camera rest, or observation equipment rest, which attachment means is provided with cooperating connection means.

7. The apparatus of claim 1 wherein a hitch device is provided for attachment to said intermediate section of said frame means for providing a hitch connection to a vehicle to be used for towing said apparatus in its folded condition.

8. The apparatus of claim 1 wherein at least one of said first and second gripping means comprises mechanically operated law means.

9. The apparatus of claim 1 wherein at least one of said first and second gripping means comprises mechanically operated jaw means, said jaw means comprising a pair of members at least one of which is pivotally connected to support means for pivotal clamping motion toward the other member, and wherein power means is provided on said support means and connected to at least one of said members by linkage means whereby selective movement of said power means will cause clamping or unclamping of said members respectively to or from said upright.

10. The apparatus of claim 1 wherein each said gripping means comprises tooth means for engaging said upright and partially penetrating thereinto, and strap means having one end affixed to tightening means mounted on stationary support means on said frame means, and having its other end adapted to loop around said upright and be removably fastened to said support means, whereby actuating of said tightening means will tighten said strap means around said upright and draw said tooth means into said upright to form a substantially rigid and highly laterally stable connection of said frame means and platform means to said upright.

11. The apparatus of claim 10 wherein said stabilizer means comprises generally bar-shaped means which is pivotally connected at one end to said frame means and which is provided with length adjustment means, whereby said stabilizer means is selectively adjustable angularly with respect to said longitudinal axis and also in length to accommodate variations in the distance and angular relationship of said frame means from and to said upright.

12. The apparatus of claim 1 wherein longitudinal segments of each said side rail means which lie adjacent said hinge means therein are dimensioned and configured with respect to a pivot axis of said hinge means and each other such as to overlap when said frame means is in a fully extended posture, and lock means are provided and adapted to be placed in position to simultaneously engage portions of both said longitudinal segments of each said side rail means at positions located a substantial distance from said axis for preventing relative motion of said upper and lower sections of said frame means about said axis.

13. The apparatus of claim 12 wherein at least one of said first and second gripping means comprises mechanically operated jaw means, said jaw means comprising a pair of members at least one of which is pivotally connected to support means for pivotal clamping motion toward the other member, and wherein power means is provided on said support means and connected to at least one of said members by linkage means whereby selective movement of said power means will cause clamping or unclamping of said members respectively to or from said upright.

* * * * *